3,251,794
TREATING VEHICLE FOR POLYESTER FILAMEN-
TARY MATERIAL AND METHOD OF IMPROV-
ING THE PROPERTIES OF SUCH MATERIAL
Paul Paliyenko, Shelby, and Herbert Wright Coates,
Charlotte, N.C., assignors to Celanese Corporation of
America, New York, N.Y., a corporation of Delaware
No Drawing. Filed July 13, 1962, Ser. No. 209,772
10 Claims. (Cl. 260—29.2)

This invention relates to a method of obtaining a filamentary material having improved crimp characteristics, high resilience, and high bulk, and to a treating vehicle for such filamentary material. More particularly, this invention relates to a method of obtaining improved filamentary material by treating such material to improve its physical properties, e.g., crimp, resilience, and bulk, this method comprising treating the filamentary material with a special vehicle, namely an aqueous emulsion comprising a silicone, and organometal catalyst and an anti-static agent.

Heretofore it has been recognized that staple filamentary materials can be used as fill for pillows, padding, comforters, and the like. With the advent of many new synthetic polymeric materials it has been apparent that certain of these materials might have particular application as fill. Important characteristics for a material to be used as a fill are its relative resilience, its bulk, its crimp characteristics, etc. While numerous staple filamentary materials have been used as a fill heretofore, it has been thought that the crimp characteristics, resilience, and bulk of such materials could be improved upon.

Accordingly, it is an object of our invention to provide an improved filamentary material, which improved material exhibits high percent crimp characteristics, high resilience, high bulk, and high crimp retention capacity.

Another object is to provide a novel method for obtaining such filamentary material.

A further object is to provide such improved filamentary material and method for obtaining the same, which material exhibits an improved resistance to compression, a resistance to matting, and a retention of desirable properties even after extensive washing.

Yet another object is to provide an improved treating vehicle for filamentary materials.

Additional objects will become apparent hereinafter.

In accordance with one aspect of our invention, a filamentary material having considerably improved bulk, high resilience, and high crimp retention is obtained by treating such material with an aqueous emulsion comprising a silicone, an organometal catalyst for the silicone, and an antistatic agent.

Unlike cross-linking resins such as urea-formaldehyde and melamine-formaldehyde resins, which resins are absorbed into and throughout the individual fibers and react internally to cross-link and basically modify the fiber properties, silicone resins are primarily located on the surface of each individual fiber and impart their useful effects as a function of the silicone film properties, e.g., hydrophobicity, low interfiber friction, etc. The improvement in fiber properties is primarily brought about by the formation of a tough, flexible, hydrophobic film of silicone resin around each individual fiber.

The silicone used in our treatment is generally formed by hydrolysis of an alkyl halosilane, e.g., methyl trichlorosilane, dimethyl dichlorosilane, trimethyl chlorosilane, methyl dichlorohydrogen silane, or mixtures thereof. Hydrolysis of any of the above compounds results in the formation of hydroxyl groups, but the hydroxyl group is generally so unstable that it will react with another hydroxyl group attached to another silicone atom to split off water and form the siloxane bridge, —Si—O—Si—, which typifies the silicone resins.

It will be apparent that if difunctional dimethyl dichlorosilane is hydrolyzed it can be made to produce linear polymers known as silicone fluids. Trimethyl chlorosilane is monofunctional and can therefore be used as a chain terminator in conjunction with silicone fluids made from dimethyl dichlorosilane, to thereby control the molecular weight of the silicone polymer. Obviously, the use of proper proportions of methyl trichlorosilane, dimethyl dichlorosilane, and trimethyl chlorosilane will result in polymeric silicone products of controlled molecular weight and controlled cross-linking.

We prefer that the silicone used in the method of our invention have a relatively low molecular weight. Desirably, the silicone is emulsified in water and the filamentary material is immersed in the emulsion so as to promote uniform penetration and distribution of the silicone onto the surface of each fiber. Such relatively low molecular weight silicone is relatively fluid. The silicone can then be insolubilized by a curing treatment to promote a durable finish.

A suitable silicone for our invention is readily made, for example, from the hydrolysis of a major portion of methyl dichlorohydrogen silane and a minor portion of dimethyl dichlorosilane. If desired, there may also be incorporated a small amount of trimethyl chlorosilane (as a chain terminator) and a small amount of methyltrichlorosilane (to promote preliminary cross-linking). The use of these starting reactants results in a relatively fluid silicone containing a major portion of methylhydrogenpolysiloxane and a minor portion of dimethylpolysiloxane.

The polymeric silicone, after it has been emulsified and the emulsion applied to a filamentary material, can then be catalytically oxidized or cured so that the silane hydrogens are converted to additional siloxane oxygen bridges, to further cross-link the silicone. The resultant cross-linked polymeric product is tough, hydrophobic, and highly lubricating. As a flexible film around the surface of each filament this polymeric product contributes to the strikingly enhanced properties of the resulting filamentary material, particularly as regards improved crimp retention, resilience and bulk.

It is convenient to first emulsify the silicone so as to initially form an aqueous emulsion of paste-like consistency. Any of the conventional silicone emulsifying agents, e.g., trimethylnonyl ether, can be used. The average particle size of the silicone polymer in this paste emulsion is generally from about 1 to 8 microns, and typically is about 5 microns. This paste is then incorporated into the finishing bath, along with catalyst and antistatic agent.

The amount of silicone in the paste emulsion will of course vary depending upon the nature of the filamentary material to be treated, the final properties desired to be imparted to the filamentary material, etc. In general, however, the amount of silicone in the paste will be from about 20 to about 45 percent by weight. A more preferred range is from about 25 to 35 weight percent.

The catalyst compound used to promote further cross-linking of the silicone is of the conventional type used for silicone curing and generally is an organometallo compound or mixture thereof, and is typically an organometallo salt. Generally the metal portion of such catalyst compound is zinc, tin, aluminum, zirconium, or the like. Suitable catalysts include zinc acetate, aluminum octoate, organic titanates, and mixtures thereof. As stated previously, such catalyst promotes oxidation of the silane hydrogens to produce additional siloxane oxygen linkages and thereby promote further cross-linking of the silicone polymer.

Generally the catalyst is maintained separately from the silicone emulsion until the finishing bath is to be prepared, and desirably is added as the last component to the finishing bath.

It is also necessary to incorporate into the treating bath for the filamentary material a polymeric cationic material, i.e. an antistatic agent. An appropriate antistatic agent serves to reduce the accumulation of static electricity on the filamentary material, and will remain effective in the filamentary material even after repeated launderings with soap.

Particularly suitable antistatic agents are described in U.S. Patent No. 2,741,568 and are generally water-insoluble polymeric quaternary ammonium carboxylate salts. Such polymeric salts are desirably polymers of ethylenically-unsaturated monomeric compounds of which at east 1% contains a vinylidene radical in which there is present only non-aromatic carbon-to-carbon unsaturation, this vinylidene radical being attached directly to a carbon atom having a double bond and being attached mediately to a nitrogen-containing group from the class consisting of tertiary amino and quaternary ammonium groups, such nitrogen-containing groups existing in the polymer in the form of quaternary ammonium groups, the anion of a majority of which is the anion of a carboxylic acid containing an acyclic carbon chain of at least 8 carbon atoms. A typical antistatic agent of the foregoing type is a poly-beta-(methacrylyl) oxyethyldiethylmethyl ammonium salt, in which polymer the anion of a majority of the quaternary ammonium groups is the anion of a long chain carboxylic acid such as stearic acid.

The treating bath emulsion comprises the silicone paste emulsion, catalyst, antistatic agent, and water.

While our invention finds application in the treatment of a wide variety of types of filamentary materials, we have found that particularly advantageous results are obtained if the filamentary material treated in accordance with our invention is of the polyester type, e.g., polyethylene terephthalate polyester or the like.

We have found that for optimum results, i.e., high crimp, high resilience, high bulk, and high crimp retention in the treated filamentary material, the total concentration of treating bath emulsion, that is, silicone, catalyst, and antistatic agent, should be from about 0.3 to about 3.9 percent by weight. If the total concentration is less than about 0.3% the resulting filamentary product does not exhibit optimum properties insofar as crimp, resilience, and bulk are concerned. On the other hand, if the concentration is much in excess of about 3.9% such higher concentrations may require pre-opening of the filamentary material and the use of lubricants, thereby rendering the process uneconomical.

Our treating bath emulsion should desirably contain from about 0.1 to 0.9 part of silicone resin, from about 0.20 to 1.80 parts of antistatic agent, from about 0.02 to 0.20 part of catalyst, and from about 99.68 to 97.1 parts of water.

A particularly preferred concentration of silicone, catalyst, and antistatic agent in the treating bath emulsion is about 0.45% silicone, 0.5% antistatic agent, and 0.15% catalyst.

Desirably the weight ratio of silicone to metal catalyst is from about 8 to 1 to about 1 to 1. A more preferred range is from about 5 to 1 to about 3 to 1.

The weight ratio of silicone to antistatic agent is desirably maintained at from about 1 to 5 to about 3 to 1, and preferably from about 0.9 to 1.8 to about 2.1 to 1.

The weight ratio of catalyst to antistatic agent is generally maintained at from about 1 to 9 to about 1 to 1.

In accordance with one aspect of the method of our invention, a filamentary material is immersed in a special treating vehicle, namely, a bath which is an aqeuous emlusion of silicone, catalyst, and antistatic agent. Thereafter, the filamentary material is stretched from about 3 to 6 times its original length in a heated zone (temperature range from about 25 to 110° C.; residence time from about 0.5 to 2.5 seconds), and is then passed to a crimping device. The crimping device is the standard stuffing box type and can be any of the conventional devices used for crimping filamentary materials. The filaments are exposed in the crimper to an elevated temperature of from about 80 to 150° C. for a period of time from about 50 to 600 seconds. Thereafter, the crimped filaments are released from the crimper.

The heating of the filaments in the crimper (stuffing box) may be accomplished by any of the usual conventional methods, e.g., heating the box itself, injecting hot air, steam, or hot water into the box, using infrared or a dielectric heating means, etc.

The resultant crimped filaments are discharged from the crimper under minimum tension and are then passed by means of a suitable conveying device to a conventional dryer. Residual moisture and any remaining volatile material is removed in the dryer, where the temperature is maintained at about from 130 to 180° C., and wherein the residence time is from about 3 to 18 minutes. This drying treatment also initiates further curing (cross-linking) of the silicone.

The resulting filaments can be cut into staple fibers and then used as filling material for fiber fill in innumerable applications, e.g., pillows, comforters, insulated underwear, insulated outerwear, furniture stuffing, bonded and/or nonbonded batting, and in general any use requiring highly resilient, bulky fiber.

It is important to note that the filamentary material can be treated with our special emulsion of silicone, catalyst, and antistatic agent by other means than by immersion and that such treatment can be effected at other points in the process. For instance, the treatment can be carried out by spraying the filamentary material at the stretching thereof; by dipping or spraying the filament after stretching; by dipping or spraying before or during the crimping; by spraying the filamentary material after it has left the crimper but prior to having been heat set in the dryer; etc.

The following example will more fully illustrate our invention. All parts are by weight unless otherwise stated.

EXAMPLE

A plurality of filamentary materials (made of polyethylene-terephthalate polyester, intrinsic viscosity range 0.3–0.8, molecular weight range 4,000–16,000), these filaments having an average diameter of about 49 microns, were prepared.

Two treating baths were prepared, one of these treating baths being a control, the other representing the improved formulation of our invention. The control treating bath was a conventional scroop-producing finish and was made up of the following components:

| Component: | Parts, percent |
|---|---|
| An alcohol phosphate antistatic agent | 1.3 |
| Non-ionic surface active agent | 0.2 |
| Water | 98.5 |

The other treating bath contained the following components:

| Component: | Parts |
|---|---|
| Silicone resin emulsion (a polysiloxane resin containing a major portion of methylhydrogenpolysiloxane and a minor portion of dimethylpolysiloxane, and emulsified with trimethylnonylether, containing 30% silicone) | 1.5 |
| Catalyst (a mixture of zinc acetate and organic titanate) | 0.3 |
| Antistatic agent (a water-insoluble polymeric quaternary ammonium carboxylate salt, 30% nonvolatiles as prepared in Example 2 of U.S. 2,741,568 lines 40 through 54) | 1.5 |
| Water | 96.7 |

The polyester filaments were divided into two portions. One portion was treated with the control treating bath, and the other with the treating bath of our invention. In these trials the filaments were immersed in the treating bath for about 0.6–1.8 seconds at a temperature of about 20–80° C. Thereafter, the filaments were passed to a heated zone maintained at a tempearture of about 100° C. and stretched to 4 to 5 times their original length. The filaments were then passed to a stuffing box crimping device and exposed to a temperature of 110° C. for about 1.5 minutes. The crimped filaments were then released from the crimper, and discharged under minimum tension. The filaments were then conveyed to a dryer and dried at a temperature of about 150° C. for about twelve minutes, thereby removing residual water and, in the case of the treating bath of our invention, further curing the silicone. The percent crimp and the number of crimps per inch were determined. The data is tabulated below:

*Fiber with silicone finish*

| Sample | Percent Crimp | Crimps/inch |
| --- | --- | --- |
| 1 | 34.9 | 11.8 |
| 2 | 37.9 | 11.5 |

*Fiber with regular finish (control)*

| Sample | Percent Crimp | Crimps/inch |
| --- | --- | --- |
| A | 17.7 | 9.3 |
| B | 28.1 | 10.7 |

The percent crimp is simply the crimped length divided by the extended (uncrimped) length, times 100.

The filaments were then cut into staple fibers and were stuffed into pillows. The dimensions of the pillows were 20" x 26". The pillow bulk, that is, the thickness under a pre-load compression of 0.0425 p.s.i., was determined. The data is given below:

*Pillow bulk; thickness under pre-load compression, in cm.*

| Fiber with Silicone Finish | | Control | |
| --- | --- | --- | --- |
| Sample: | | Sample: | |
| 1 | 12.5 | A | 11.6 |
| 2 | 12.4 | B | 11.3 |

The resilience of the staple fibers was determined by obtaining compression and recovery data on the pillows. The results are tabulated below:

*Resilience in terms of compression and recovery data, pillow thickness in cm.*

FIBER WITH SILICONE FINISH

| Sample | 100 lbs. Compression | Recovery |
| --- | --- | --- |
| 1 | 5.9 | 8.9 |
| 2 | 5.9 | 8.9 |

CONTROL

| Sample | 100 lbs. Compression | Recovery |
| --- | --- | --- |
| A | 5.3 | 8.2 |

It will be seen that the filaments treated with the treating bath of our invention invariably exhibited a higher percent crimp, a higher number of crimps per inch, a greater bulk, and a greater recovery, than did the filaments treated with the control.

The silicone resin of the novel formulations may be any of those described in U.S. Patent No. 2,588,365.

It is to be understood that the foregoing detailed description is given merely by way of illustration and that many variations may be made therein without departing from the spirit of our invention.

Having described our invention what we desire to secure by Letters Patent is:

1. A treating vehicle for polyester filamentary materials to improve the bulk, crimp characteristics and resilience thereof, which comprises an aqueous emulsion containing from about 0.1 to about 0.9 percent of silicone resin, from about 0.02 to about 0.20 percent of a curing catalyst for said silicone resin and from about 0.20 to about 1.80 percent of a water-insoluble quaternary ammonium carboxylate salt.

2. A treating vehicle for polyester filamentary materials to improve the bulk, crimp characteristics and resilience thereof, which comprises an aqeuous emulsion containing from about 0.1 to about 0.9 part of a silicone resin which is a mixture of methylhydrogenpolysiloxane and dimethylpolysiloxane, from about 0.02 to about 0.20 part of a curing catalyst for said silicone resin, from about 0.20 to about 1.80 parts of a water-insoluble quaternary polymeric ammonium carboxylate salt, and from about 99.68 to about 97.1 parts of water.

3. The product of claim 2 wherein the weight ratio of silicone to catalyst is from about 8 to 1 to about 1 to 1.

4. The product of claim 2 wherein the weight ratio of silicone to quaternary salt is from about 1 to 5 to about 3 to 1.

5. The product of claim 2 wherein the weight ratio of catalyst to quaternary salt is from about 1 to 9 to about 1 to 1.

6. A method of producing a polyester filamentary material having improved crimp characteristics, high resilience and high bulk which comprises applying to said polyester filamentary material a vehicle comprising an aqueous emulsion of siliocne resin, a curing catalyst for said silicone resin and a water-insoluble quaternary ammonium carboxylate salt wherein the total concentration of said silicone resin, said curing catalyst and said water-insoluble quaternary ammonium carboxylate salt ranges from about 0.3 to about 3.9 weight percent of said polyester filamentary material.

7. The product of the process of claim 6.

8. A method of producing a polyester filamentary material having improved crimp characteristics, high resilience and high bulk which comprises applying to said polyester filamentary material a vehicle comprising an aqueous emulsion containing from about 0.1 to about 0.9 part of a silicone resin, which is a mixture of methylhydrogenpolysiloxane and dimethylpolysiloxane, from about 0.02 to about 0.20 part of a curing catalyst for said silicone resin, from about 0.20 to about 1.80 parts of a water-insoluble quaternary polymeric ammonium carboxylate salt and from about 99.68 to about 97.1 parts of water, wherein the total concentration of said silicone resin, said curing catalyst and said water-insoluble quaternary ammonium carboxylate salt ranges from about 0.3 to about 3.9 weight percent of said polyester filamentary material.

9. The process of claim 8 wherein the weight ratio of silicone to catalyst ranges from about 8 to 1 to about 1 to 1.

10. The process of claim 8 wherein the weight ratio of catalyst to quaternary salt being from about 1 to 9 to about 1 to 1.

(References on following page)

References Cited by the Examiner

UNITED STATES PATENTS

| | | | |
|---|---|---|---|
| 2,588,365 | 3/1952 | Dennett | 260—46.5 |
| 2,741,568 | 4/1956 | Hayek | 260—29.2 |
| 2,750,305 | 6/1956 | Gagarine et al. | 260—46.5 |
| 2,807,601 | 9/1957 | Dennett | 260—46.5 |
| 2,911,324 | 11/1959 | Evans et al. | 260—29.2 |
| 3,109,182 | 11/1963 | Doak | 5—337 |

LEON J. BERCOVITZ, *Primary Examiner.*

DONALD E. CZAJA, *Examiner.*

J. J. KLOCKO, *Assistant Examiner.*